United States Patent
Sun

(10) Patent No.: US 8,694,467 B2
(45) Date of Patent: Apr. 8, 2014

(54) RANDOM NUMBER BASED DATA INTEGRITY VERIFICATION METHOD AND SYSTEM FOR DISTRIBUTED CLOUD STORAGE

(75) Inventor: Yu-An Sun, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 367 days.

(21) Appl. No.: 12/751,676

(22) Filed: Mar. 31, 2010

(65) Prior Publication Data

US 2011/0246433 A1 Oct. 6, 2011

(51) Int. Cl.
*G06F 7/00* (2006.01)
*G06F 17/00* (2006.01)

(52) U.S. Cl.
USPC ............ 707/640; 707/661; 707/687; 707/690

(58) Field of Classification Search
USPC .......................................... 707/640, 690, 802
See application file for complete search history.

(56) References Cited

U.S. PATENT DOCUMENTS

| | | | |
|---|---|---|---|
| 6,847,995 B1 | 1/2005 | Hubbard et al. | 709/223 |
| 8,285,681 B2* | 10/2012 | Prahlad et al. | 707/640 |
| 2003/0041110 A1* | 2/2003 | Wenocur et al. | 709/206 |
| 2003/0051021 A1 | 3/2003 | Hirschfeld et al. | 709/223 |
| 2007/0244951 A1* | 10/2007 | Gressel et al. | 708/252 |
| 2008/0077638 A1 | 3/2008 | Monk et al. | 707/205 |
| 2009/0138710 A1* | 5/2009 | Minematsu | 713/170 |
| 2009/0299905 A1 | 12/2009 | Mestha et al. | 705/76 |
| 2009/0300215 A1 | 12/2009 | Gnanasambandam et al. | 709/242 |
| 2010/0042720 A1 | 2/2010 | Stienhans et al. | 709/226 |
| 2010/0061250 A1 | 3/2010 | Nugent | 370/242 |
| 2010/0268692 A1* | 10/2010 | Resch | 707/687 |
| 2010/0274765 A1* | 10/2010 | Murphy et al. | 707/652 |
| 2010/0299313 A1* | 11/2010 | Orsini et al. | 707/652 |
| 2011/0055161 A1* | 3/2011 | Wolfe | 707/652 |
| 2011/0113115 A1* | 5/2011 | Chang et al. | 709/213 |
| 2012/0030176 A1* | 2/2012 | Gelson et al. | 707/640 |

\* cited by examiner

*Primary Examiner* — Robert Beausoliel, Jr.
*Assistant Examiner* — Hexing Liu
(74) *Attorney, Agent, or Firm* — Kermit D. Lopez; Luis M. Ortiz; Ortiz & Lopez, PLLC

(57) ABSTRACT

A data integrity verification method and system based on a root random number to ensure secure distributed data storage on a public cloud. A new root random number can be generated in response to receiving a file for storage to the public cloud. A unique random number tag for each data chunk associated with the file can be calculated via a shift operation and the tag can be added to the data chunk. A hash function (message digests) can be then generated and concatenated with the data chunk and the random number tag. The data chunk in conjunction with the hash and the random number tag can be encrypted by an encryption module and stored to the public cloud in order to provide multiple levels of security with respect to the distributed public cloud storage. Upon file retrieval, the encryption module decrypts all data chunks and recalculates the hash in order to verify the data integrity of the file.

11 Claims, 6 Drawing Sheets

RANDOM NUMBER BASED DATA INTEGRITY VERIFICATION METHOD AND SYSTEM FOR DISTRIBUTED CLOUD STORAGE

TECHNICAL FIELD

Embodiments are generally related to distributed cloud storage systems and methods. Embodiments also relate in general to the field of computers and similar technologies, and in particular to software utilized in this field. Embodiments are additionally related to the provision of a secure cloud-based data storage and subsequent data retrieval.

BACKGROUND OF THE INVENTION

Network storage systems have been developed in response to the increasing proliferation of data requirements and web services. Network storage systems generally focus on the storage, protection and retrieval of data in large-scale environments. Such massive network storage systems are also referred to as a cloud storage system, which includes a master control server and several storage servers to provide various types of network services to a host of client devices. Cloud storage system involves storing data on multiple virtual servers that are generally hosted by a third party.

Data security is of extreme importance to all entities utilizing data processing and computing systems. Because data storage on a public cloud is distributed, single file can be divided into several pieces and stored at different location. Unauthorized access to the stored data can be initiated from external sources as well as internal sources without authorization to access the data, leading to copying or loss of valuable data. For example, an attacker can modify the encrypted data, control the flow attack and replay the attack resulting in the loss and/or corruption of the stored data and a tremendous risk for piracy of the content. The attacker can move valid data pieces around or change the correct sequence of the distributed data chunks in the control flow attack. Also, the attacker can obtain an older valid copy and replace the most recent one with the older copy in the replay attack. Hence in order to ensure a secure distributed data storage on the public cloud a data integrity verification scheme needs to overcome such types of attacks.

Based on the foregoing, it is believed that a need exists for an improved distributed cloud storage systems and methods. A need also exists for an improved data integrity verification method based on a root random number to ensure a secure distributed data storage on a public cloud, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved distributed cloud storage system and method.

It is another aspect of the disclosed embodiments to provide for an improved data integrity verification method and system based on a root random number to ensure a secure distributed data storage on a public cloud.

It is a further aspect of the disclosed embodiments to provide for an improved method for encrypting each data chunk associated with a file in conjunction with a hash function and a random number tag.

The aforementioned aspects and other objectives and advantages can now be achieved as described herein. A data integrity verification method and system based on a root random number to ensure secure distributed data storage on a public cloud is disclosed herein. The system generally includes an encryption module, a message digest module and a random number module associated with a look-up table, which is stored in a secure private storage within an enterprise. A new root random number can be generated in response to receiving a file for storage to the public cloud. A unique random number tag for each data chunk associated with the file can be calculated via a shift operation (e.g., 1-bit cyclic left shift) and the tag can be added to the data chunk.

The random number tag can be employed to verify the data chunk is a most recent copy with a correct sequence and data integrity. A hash function (message digests) can be then generated and concatenated with the data chunk and the random number tag The data chunk in conjunction with the hash and the random number tag can be encrypted by an encryption module and stored to the public cloud in order to provide multiple levels of security with respect to the distributed public cloud storage. Upon file retrieval, the encryption module decrypts all data chunks and recalculates the hash in order to verify the data integrity of the file.

The data chunks associated with the file can be retrieved back and transmitted to the encryption module in order to access the file stored on the public cloud. The data chunks can be decrypted and the hash can be recalculated from the decrypted data. The hash function can be then compared with all the decrypted hash in order to check the validity of the data chunk. Thereafter, the correct random number tag can be computed in accordance with the corresponding root random number stored on the private storage. The correct random number tag associated with each data chunk can be compared with the decrypted random number tag to verify the data chunks associated with the file stored to the cloud is encrypted and is not modified or reordered.

The random number module includes a pseudo random number generator and the private data storage that stores a list of random numbers for a chain of data chunks. The chained random numbers can be derived from an initial random number root and the data chunks associated with the same file shares the same root random number. The system and method described herein provides four levels of security with respect to the public cloud storage. The data confidentiality can be verified by the encryption process and the data validation can be verified by the encryption and hash process. The correct data sequence and the most recent copy can be verified by the encryption, hash and the random number generator. Such an approach requires less computation power as the random number generator and a shift register can be built with simple hardware.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
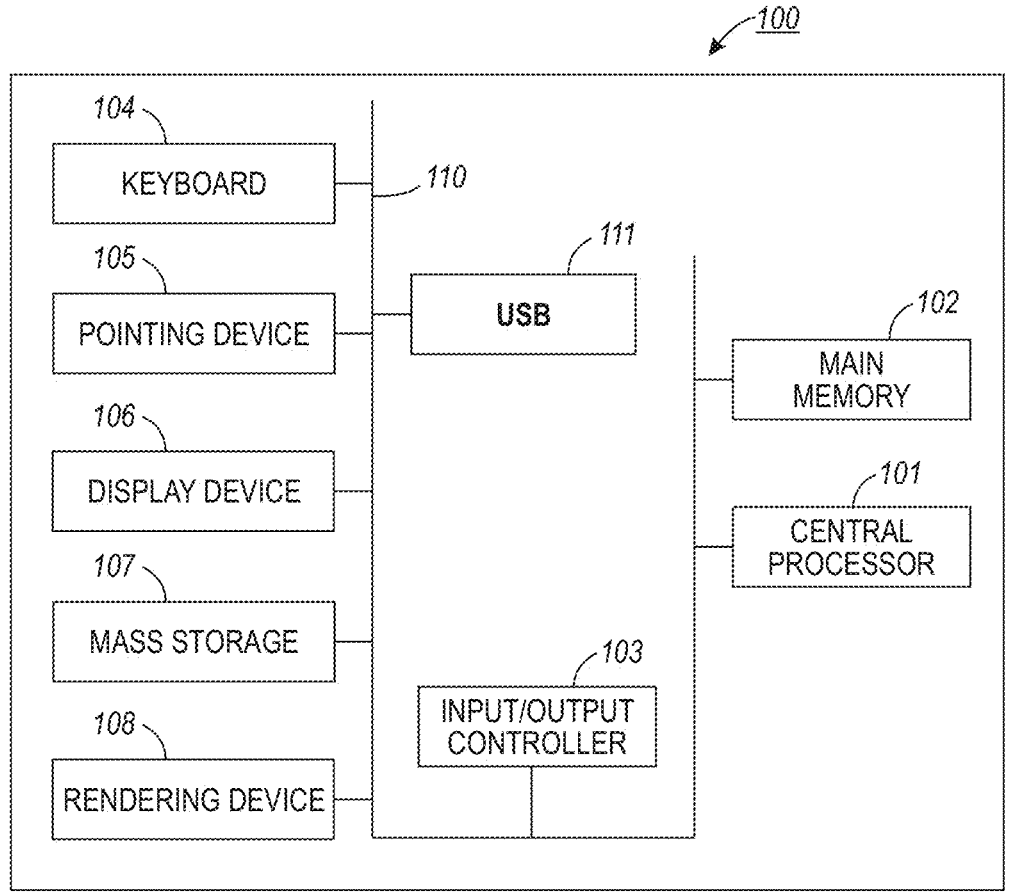
FIG. 1 illustrates a schematic view of a data-processing system in which an embodiment may be implemented.
Figure 2:
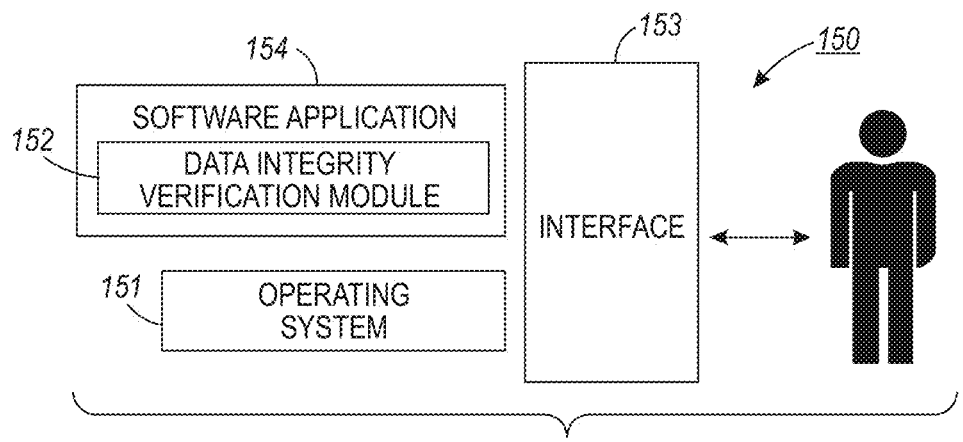
FIG. 2 illustrates a schematic view of a software system including an operating system, application software, and a user interface for carrying out an embodiment.
Figure 3:
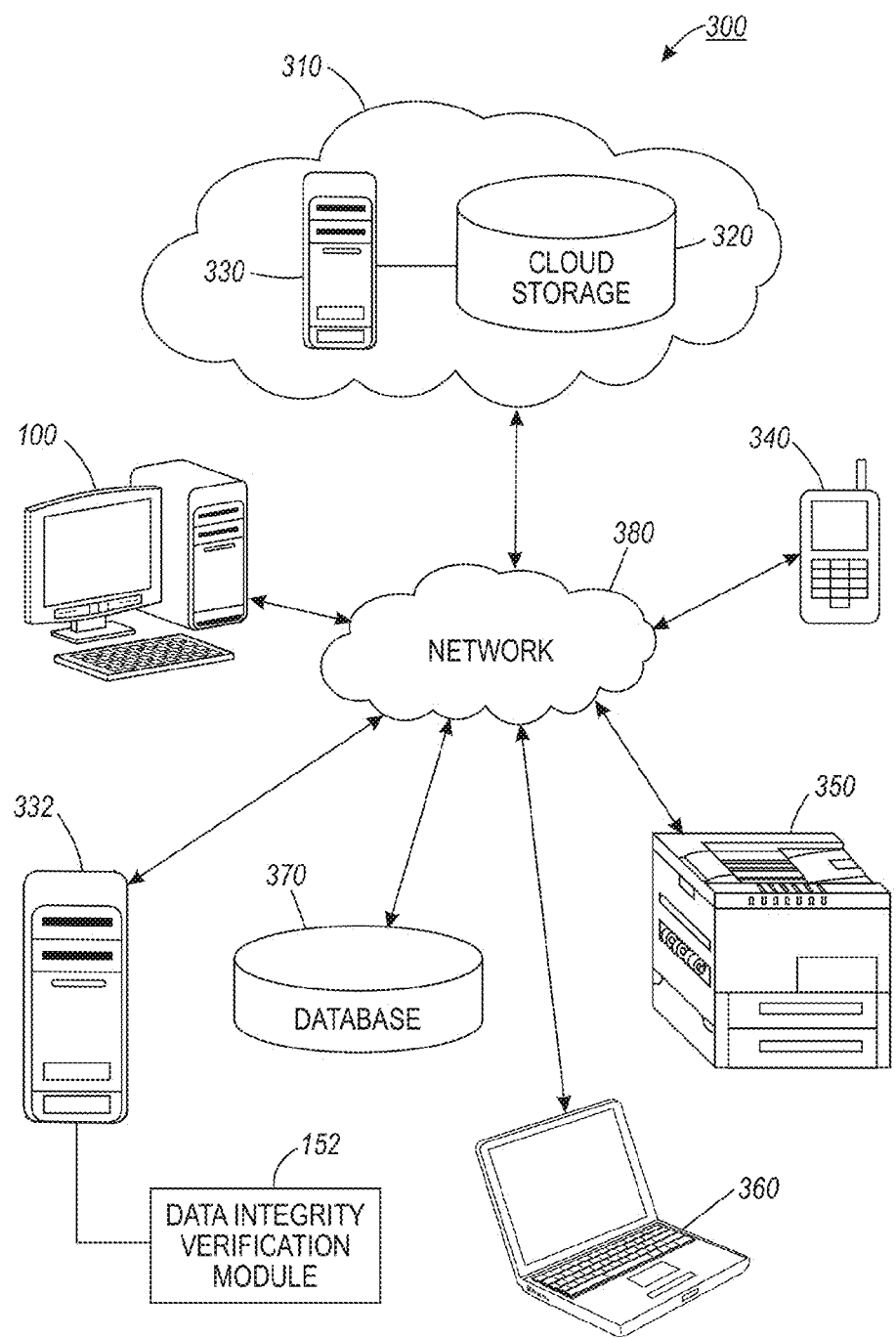
FIG. 3 illustrates a graphical representation of distributed cloud storage system in which aspects of the disclosed embodiments may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device, such as a mouse, track ball, pen device, etc), a display device 106, a mass storage 107 (e.g., a hard disk), and a USB (Universal Serial Bus) peripheral connection 111. Additional input/output devices, such as a rendering device 108 (e.g., printer, scanner, fax machine, etc), for example, may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of systems are potential. For example, rather than a traditional "Windows" system, other operation systems, such as, for example, Linux may also be employed with respect to operating system 151 and interface 153. The software application 154 can include, for example, a data integrity verification module 152 that can be adapted for providing a secure cloud-based data storage and subsequent data retrieval. The data integrity verification module 152 can be adapted for encrypting each data chunk associated with a file in conjunction with a hash function and a random number tag. The data integrity verification module 152 can include instructions, such as those of method 600 and 700 respectively discussed herein with respect to depicted in FIGS. 6-7.

FIG. 3 illustrates a graphical representation of distributed cloud storage system 300 in which aspects of the disclosed embodiments may be implemented. The distributed cloud storage system 300 generally includes a cloud infrastructure 310 associated with the data-processing system 100, a multi-function device 350, a mobile communication device 340, a laptop 360 and a database 370. The cloud infrastructure 310 further includes a server 330 that connects to the network 380 along with a storage unit 320 (e.g. a memory, database, etc). Data-processing system 100 depicted in FIG. 1 can be, for example, a server. Other devices such as, for example, desktops, network devices, palmtops, etc may also be included in the cloud infrastructure 310, as service providers.

The cloud storage system 300 contains network 380, which is the medium employed to provide communications link between the cloud infrastructure 310 and various devices and computers. Network 380 may include connections, such as wire, wireless communication links, or fiber optic cables. The cloud storage system 300 may include additional servers, clients, and other devices not shown. Specifically, clients may connect to any member of a network of servers which provide equivalent content.

As used herein, 'cloud' may refer to a collection of resources (e.g., hardware, data and/or software) provided and maintained by an off-site or off-premise party (e.g., third party), wherein the collection of data and resources can be accessed by an identified user via a network. The "cloud" storage system can include data storage services, data processing services (e.g., applications), and many other services that are conventionally associated with and resident within personal computers or local or 'on-premise' servers. In general, cloud computing may be employed to perform services in a dissociative way i.e., the client may not know where the service is performed as long as the service is performed with the expected quality of service.

Cloud computing can be employed to solve "grid" scale problems that may require an inordinate amount of time and resources for a single computer to solve. For example, in cloud computing large amounts of data from the data-processing system 100 can be broken into much smaller pieces that are executed in parallel, and the results may be combined at the end. The data integrity verification module 152 can be associated with, for example, a stand-alone server 332 outside of the cloud 310. That is, for example, the server 332 may be located within an enterprise, home, etc. The data integrity verification module 152 can encrypt and verify files stored, for example, with the cloud storage location or memory 320. The data integrity verification module 152 can provide, for example, storage of encrypted data by a third-party service provider on behalf of an intended user.

In the depicted example, network 380 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network 380 also may be implemented as a number of different types of networks, such as for example, an intranet, a local area network (LAN), or a wide area network (WAN).

The description herein is presented with respect to particular embodiments of the present invention, which may be embodied in the context of a data-processing system, such as, for example, data-processing system 100 and computer software system 150 illustrated with respect to FIGS. 1-3. Such embodiments, however, are not limited to any particular application or any particular computing or data-processing environment. Instead, those skilled in the art will appreciate that the disclosed method and system may be advantageously applied to a variety of system and application software. Moreover, the present invention may be embodied on a variety of different computing platforms, including Macintosh, UNIX, LINUX, and the like.

Figure 4:
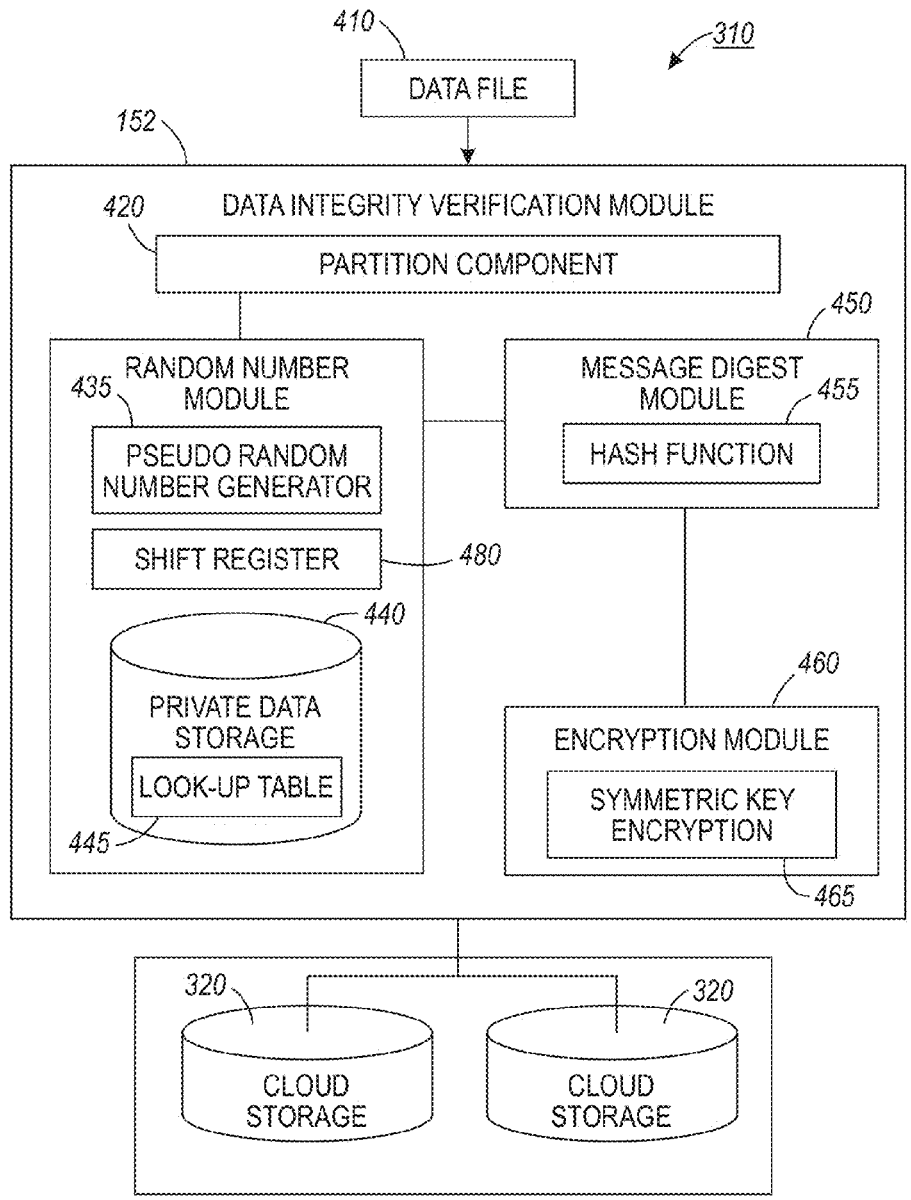
FIG. 4 illustrates a block diagram of a data integrity verification module associated with the distributed cloud storage system, in accordance with the disclosed embodiments.

FIG. 4 illustrates a block diagram of the data integrity verification module 152 associated with the distributed cloud storage system 300, in accordance with the disclosed embodiments. Note that in FIGS. 1-7, identical or similar blocks are generally indicated by identical reference numerals. The data integrity verification module 152 generally includes an encryption module 460, a message digest module 450 and a random number module 430. The random number module 430 further includes a pseudo random number generator 435, a shift register 480 and a private data storage module 440 that stores a list of current random numbers in a look-up table 445. The random number module 430 can be configured to generate a new root random number with respect to a file 410 and a random number tag for each data chunk associated with the file 410. The message digest module 450 can be configured to generate a hash function 455 (e.g., message digests) and concatenate with the data chunk and the random number tag. In general, a cryptographic hash function is a deterministic procedure that takes an arbitrary block of data and returns a fixed-size bit string, the (cryptographic) hash value, such that an accidental or intentional change to the data can change the hash value. Note that the module 440 (i.e., private data storage) can store a root random number associated with the encryption module 460 for each file, and not merely a single root random number shared with, for example, several files. Each file can be then "chunked" up to a number of data chunks before being out to the "cloud". Each data chunk can possess a corresponding random number (e.g., RN1, RN2, RN3 . . . etc., as shown for example in FIG. 5).

The data to be encoded is often called the "message", and the hash value is sometimes called the message digest or simply digest. Cryptographic hash functions have many information security applications, notably in digital signatures, message authentication codes (MACS), and other forms of authentication. They can also be employed as ordinary hash functions, to index data in hash tables, for fingerprinting, to detect duplicate data or uniquely identify files, and as checksums to detect accidental data corruption. Indeed, in information security contexts, cryptographic hash values are sometimes called (digital) fingerprints, checksums, or just hash values, even though all these terms stand for functions with rather different properties and purposes.

Note that the hash function 455 can be for example, SHA-1 (Secure Hash Algorithm 1), or SHA-256 hash function. SHA-1 is a 160-bit (20-byte) hash function specified in FIPS PUB 180-2 Secure Hash Standard [FIPS180]. SHA-256 is the newer standard intended as a companion for the new Advanced Encryption Standard (AES) to provide a similar level of enhanced security. SHA-256 is a 256-bit (32-byte) hash and is meant to provide 128 bits of security against collision attacks. SHA-256 is also specified in FIPS PUB 180-2 [FIPS180]. The hash function 455 is a number which can be created algorithmically from the file 410 and represents that file 410 uniquely. If the file changes, the hash function 455 will change. Additionally, the hash function 455 can also be employed to identify duplicate files.

The encryption module 460 can be configured to encrypt and decrypt the file 410 including the random number tag and the hash function 455. The encryption module 460 supports a symmetric-key encryption 465, for example AES-128, AES-192 or AES-256. In general, the AES specifies a FIPS-approved cryptographic algorithm that can be employed to protect electronic data. The AES algorithm is a symmetric block cipher that can encrypt (encipher) and decrypt (decipher) information. Encryption converts data to an unintelligible form called cipher text; decrypting the cipher text converts the data back into its original form, called plaintext. The AES algorithm is capable of using cryptographic keys of 128, 192, and 256 bits to encrypt and decrypt data in blocks of 128 bits. The data integrity verification module 152 can use the database 320 to store and retrieve the file 420.

Figure 5:
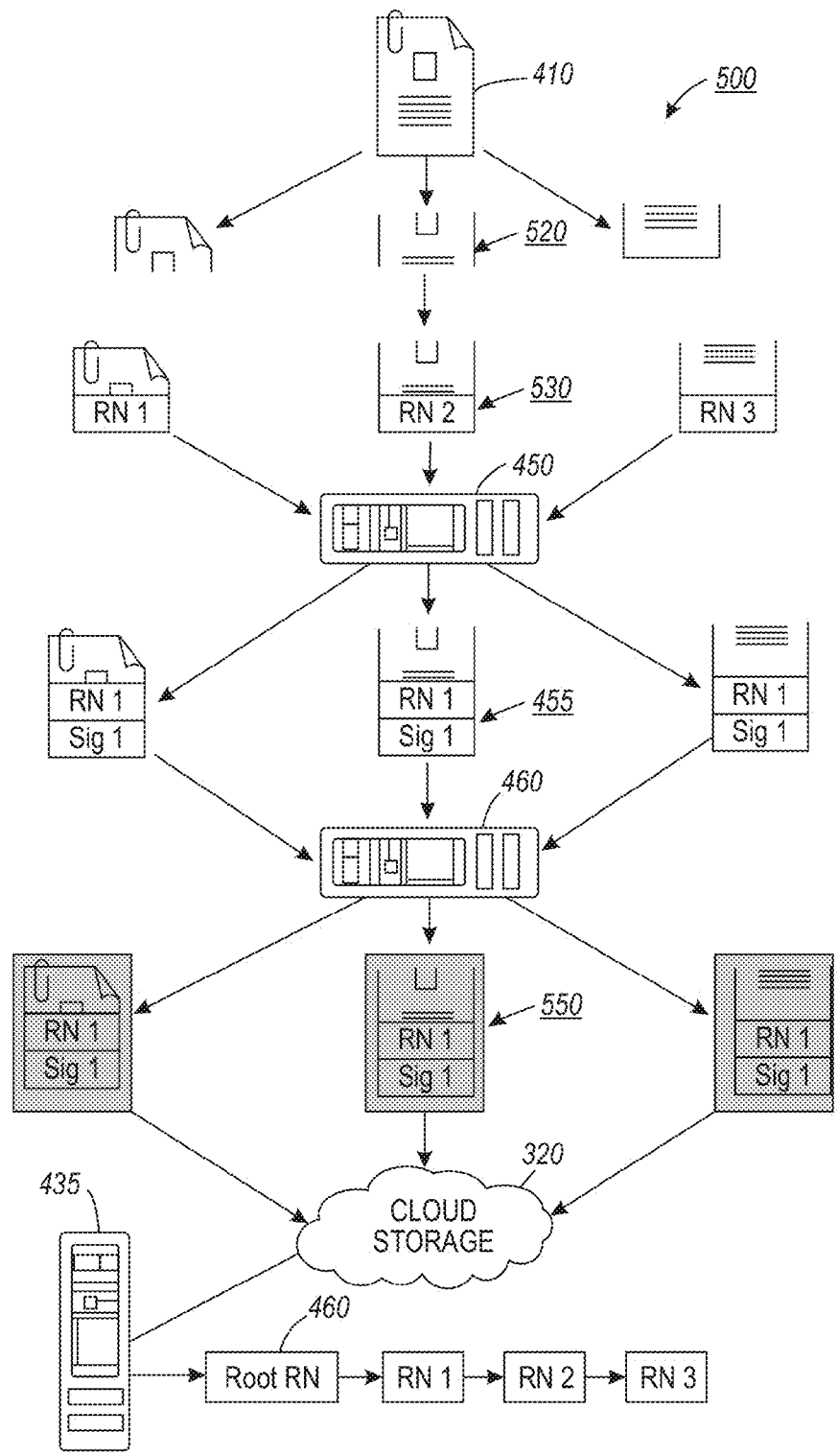
FIG. 5 illustrates a schematic diagram illustrating logical operation steps for encrypting and verifying a file stored with respect to the distributed cloud storage system, in accordance with the disclosed embodiments.

FIG. 5 illustrates a schematic diagram 500 illustrating logical operation steps for encrypting and verifying the file 410 stored with respect to the distributed cloud storage system 300, in accordance with the disclosed embodiments. The file 410 can be divided into n pieces of data chunks 520. The data chunk 520 is the smallest data unit that has to be encrypted together. A root random number 560 can be generated as a chain such as, for example, RN1, RN2 and RN3 by the pseudo random number generator 435. The root random number 560 can be stored in trusted data storage, such as the private storage 440 or memory on the MFD 350. The root random number 560 can be generated every time the file 410 is evicted to the public cloud 310. The data chunks 520 associated with the same file 410 shares the same root random number 560. For example, consider $Shift_n(\ldots Shift_2(Shift_1(RNroot))\ldots)$, n is the number of chucks that share the same root random number. The chained random number 560 can be employed to verify data integrity and the most recent copy. Such an approach requires less computation power as the random number generator 435 and the shift register 480 can be built with simple hardware.

A unique random number tag 530 for each data chunk 520 associated with the 410 file can be calculated through a 1-bit cyclic left shift operation via the shift register 480. The cyclic left shift operation is as follows: bits shifted out of the sign bit position enter the least significant bit position and, consequently, no bits are lost. The unique random number tag RN1, RN2 and RN3 can be added to the data chunk 520. The pseudo random number generator 435 can be easily composed by 2-3 linear feedback shift register (LFSR) 480, depending upon design consideration. Each entry of the lookup table 445 serves as a root random number for a sequence of data chunks. For example, the 010 entry of the lookup table is the root random number of 00010, 01010, 10010 and 11010 data chunks. The calculation of the random number tag for each data chunk is a 1-bit cyclic left shift from the root random number. For example, if each root random number is only 8-bit long, and the root random number at the 010 entry of the lookup table is $(01001011)_2$, the random number tag of chunk 00010 is $(10010110)_2$ and that of chunk 01010 $(00101101)_2$ is, etc.

The random number tag 530 can be employed to verify data integrity and the data chunk 520 is a most recent copy with a correct sequence. The hash function 455 can be then generated and concatenated with the data chunk 520 and the unique random number tag 530 by the message digest module 450. The data chunk 520 including the hash 455 and the random number tag 530 can be encrypted by the encryption module 460 and the encrypted data 550 can be stored to the public cloud storage 320. Upon file retrieval, the encryption module 460 decrypts all data chunks 520 and recalculates the hash 455 in order to verify the integrity of the file. The message digests can be commonly employed in cryptographic scheme to verify data integrity. The hash 455 and the random number tag 530 can be encrypted in same blocks of AES that makes the adversary unable to identify between the hash and the random number tag amidst the encrypted data.

The data chunks 520 associated with the file 410 can be retrieved back and transmitted to the encryption module 550 in order to access the file 410 stored on the public cloud 320. The data chunks 520 can be decrypted and the hash 455 can be recalculated from the decrypted data. The hash 455 can be then compared with all the decrypted hash in order to check the validity of the data chunk 520. Thereafter, the correct random number tag 530 can be computed in accordance with the corresponding root random number stored on the private storage 440. The correct random number tag 530 for each data chunk can be compared with the decrypted random number tag to verify each data chunks associated with the file stored to the cloud is encrypted and is not modified or reordered.

Figure 6:
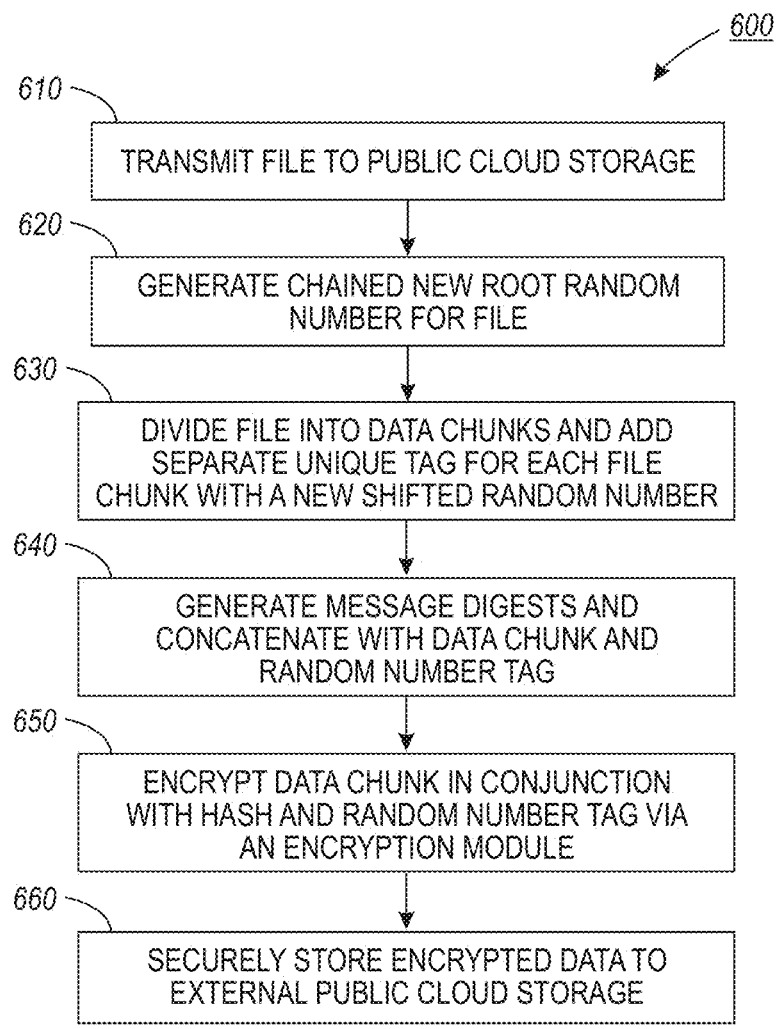
FIG. 6 illustrates a high level flow chart of operation illustrating logical operation steps of a method for encrypting and storing encrypted data in the distributed cloud storage system, in accordance with the disclosed embodiments.

FIG. 6 illustrates a high level flow chart of operation illustrating logical operation steps of a method 600 for encrypting and storing encrypted data in the distributed cloud storage system 300, in accordance with the disclosed embodiments. The file 410 can be transmitted to the public cloud storage 320, as illustrated at block 610. The chained new root random number 460 for the file 410 can be generated, as indicated at block 620. The file 410 can be divided into data chunks 520 and separate unique tag 530 with a new shifted random number 520 can be added for each data chunk, as depicted at block 630. Thereafter, as indicated at block 640, the message digests (hash) 455 can be generated and concatenated with the data chunk 520 and the random number tag 530. The data chunk 520 in conjunction with the hash 455 and the random number tag 530 can be encrypted via the encryption module 460, as depicted at block 650. The encrypted data can be securely stored to external public cloud storage 320, as illustrated at block 660.

Figure 7:
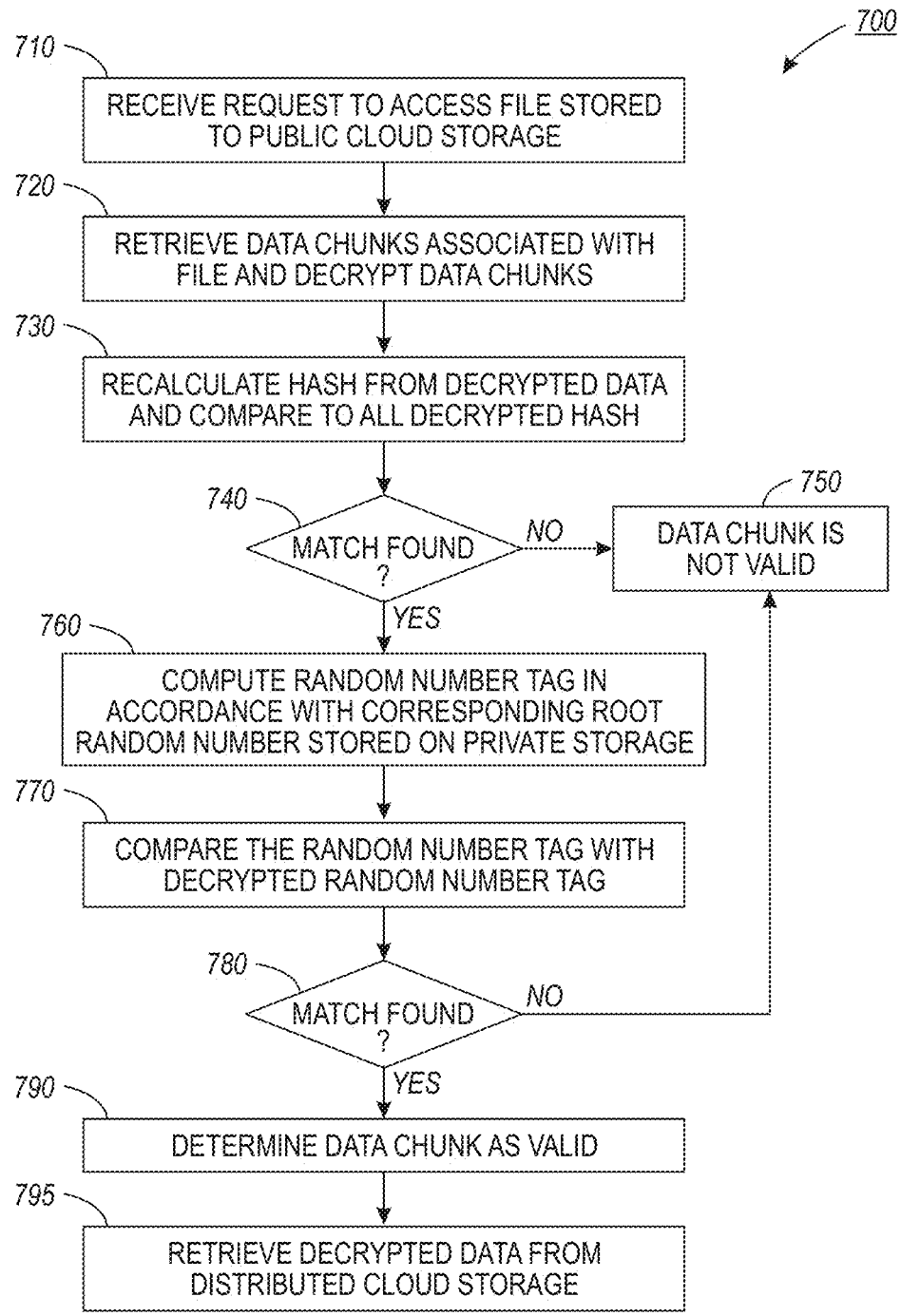
FIG. 7 illustrates a high level flow chart of operation illustrating logical operation steps of a method for retrieving and decrypting the encrypted data from the distributed cloud storage system, in accordance with the disclosed embodiments.

FIG. 7 illustrates a high level flow chart of operation illustrating logical operation steps of a method 700 for retrieving and decrypting the encrypted data from the distributed cloud storage system 300, in accordance with the disclosed embodiments. Again as reminder, in FIGS. 1-7, identical or similar blocks are generally indicated by identical reference numerals. A request to access the file 410 stored to the public cloud storage 320 can be received, as indicated at block 710. The data chunks 520 associated with the file 410 can be retrieved and the data chunks 520 can be decrypted, as illustrated at block 720.

The hash 455 can be the recalculated from the decrypted data and compared to all decrypted hash, as depicted at block 730. A determination can be made whether a match is found, as indicated at block 740. If a match is found the data chunks is not valid, as depicted at block 750. The random number tag 455 in accordance with corresponding root random number stored on the private storage 445 can be computed, as indicated at block 760. The random number tag can be compared with decrypted random number tag, as depicted at block 750. A determination can be made whether a match is found, as indicated at block 780. If a match is found the data chunks is valid and the file 410 can be retrieved, as depicted at blocks 790 and 795.

The system 300 provides four levels of security with the public cloud storage. The data confidentiality can be verified by the encryption process and the data validation can be verified by the encryption and the hash process. The correct data sequence and the most recent copy can be verified by the encryption, hash and the random number generator 435. For example, the random number based approach provides level 3 and level 4 security. Each random number tag can be obtained from the direct-mapped random number lookup table 445 hence if any attacker moves one valid data chunk to another location, the random number tag comparison will not match and can be detected. Similarly, if the attacker injects an old copy of a valid data stored at the same address before, because the random number is not updated based on the current root random number, it can also be detected. Additionally, as the random number tag is encrypted along with hash and data, the adversary cannot change the content of the random number tag unless the key of encryption is revealed.

While the present invention has been particularly shown and described with reference to a preferred embodiment, it will be understood by those skilled in the art that various changes in form and detail can be made therein without departing from the spirit and scope of the invention. Further-more, as used in the specification and the appended claims, the term "computer" or "system" or "computer system" or "computing device" includes any data processing system or apparatus including, but not limited to, personal computers, servers, workstations, network computers, main frame computers, routers, switches, a Personal Digital Assistants (PDA), cellular telephones, Smartphones, and/or any other system/device capable of processing, transmitting, receiving, capturing and/or storing data.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A data integrity verification method, said method comprising:
    generating a new root random number in response to receiving a file to be stored in a distributed public cloud;
    parsing the file into data chunks;
    using the root random number to generate a plurality of serialized tags to identify a version and position of a data chunk in a sequence of the data chunks;
    associating serialized tags in the plurality of serialized tags with data chunks,
    generating a file specific hash value and concatenating said hash value with said data chunk and said serialized tags;
    encrypting, via symmetric-key encryption, said data chunk in conjunction with said hash value and said serialized tags and;
    storing said encrypted data chunks into said public cloud;
    decrypting said data chunk associated with said data file in response to retrieval of said data file;
    recalculating said hash value and comparing said recalculated hash value with said decrypted hash value;
    deriving a serialized tag from said root random number; and
    comparing said derived serialized tag for each data chunk with said decrypted serialized tag to verify data integrity of said data associated with said file based on results of said compare.

2. The method of claim 1 further comprising decrypting said data chunk in response to a request to retrieve of said file.

3. The method of claim 1 further comprising recalculating said hash value and comparing said recalculated hash value with a decrypted hash value.

4. The method of claim 1 further comprising computing said serialized tag using said random root random number and comparing said computed serialized tag with a decrypted tag to check integrity of the retrieved data.

5. The method of claim 1 further comprising storing said a plurality of root random numbers in a look-up table associated with a at least one private cloud, each of time root random numbers being associated with a version and position of an individual data chunk among a plurality of sequentially processed data chunks.

6. A data integrity verification system, said system comprising:
    a processor; a data bus coupled to said processor; and a computer-usable non-transitory medium embodying computer code, said computer-usable medium being coupled to said data bus, said computer program code comprising instructions executable by said processor and configured to:
    generate a new root random number in response to receiving a file to be stored in a distributed public cloud;
    parse the file into data chunks;
    generate a plurality of serialized tag;
    attach the serialized tag to each data chunk associated with said file the serialized tag to identify a version and sequence of the data chunk among a plurality of data chunks;
    create a file specific hash value and concatenate said hash value with said data chunk and said serialized tag;
    encrypt, via symmetric-key encryption, said data chunk in conjunction with said hash value and said serialized tag; and,
    store said encrypted data chunk, said hash value and said serialized tag into said public cloud;
    decrypt said data chunk associated with said file in response to a request to retrieve said file;
    recalculate said hash value and compare said recalculated hash value with said decrypted hash value;
    compute said serialized tag in accordance with said root random number;
    compare said computed serialized tag associated with said data chunk with said decrypted serialized tag; and
    verify integrity of data retrieved from said file.

7. The system of claim 6 wherein said instructions are further configured to decrypt said data chunk associated with said file in response to a request for retrieval of said file.

8. The system of claim 6 wherein said instructions are further configured to calculate said hash value and compare said calculated hash value with a decrypted hash value retrieved from said distributed cloud.

9. The system of claim 6 wherein said instructions are further configured to compute said serialized tag using said root random number and to compare said computed serialized tag associated with said data chunk with a decrypted serialized tag to verify integrity of retrieved data.

10. The system of claim 6 wherein said instructions are further configured to store said plurality of root random numbers in a data chunk lookup table; and,
    assign each root random number to each data chunks in a chain of data chunks which comprise at least a portion of said file in said private cloud.

11. A data integrity verification system, said system comprising:
    a processor;
    a data bus coupled to said processor; and
    a computer-usable non-transitory storage medium embodying computer code, said computer-usable medium being coupled to said data bus, said computer program code comprising instructions executable by said processor and configured to:
    generate a root random number in response to receiving a file to be stored in a distributed public cloud;
    parse the file into a plurality of data chunks;
    generate a plurality of serialized tag each tag in the plurality of tags to identify a version and sequence of a data chunk in the plurality of data chunks;
    associate the serialized tag with a data chunk;
    generate a hash value and concatenate said hash value with said data chunk and said serialized tag to facilitate a data integrity check of said data chunk; and
    encrypt, via symmetric-key encryption, said data chunk with said hash value and said serialized tag;
    store said encrypted data chunk, said hash value and said serialized tag into said public cloud; and
    store at least one root random number associated with said file in a data chunk look up table decrypt said data chunk associated with said file in response to retrieval of said file;
recalculate said hash value; compare said recalculated hash value with said decrypted hash value;
compute said serialized tag using said root random number;
compare said computed serialized tag associated with said data chunk with said decrypted serialized tag; and
verify data integrity of data in said data chunk.

* * * * *